(12) United States Patent
Nakaguchi et al.

(10) Patent No.: US 9,656,538 B2
(45) Date of Patent: May 23, 2017

(54) VEHICLE DOOR FRAME

(71) Applicant: SHIROKI CORPORATION, Kanagawa (JP)

(72) Inventors: Nobutaka Nakaguchi, Kanagawa (JP); Isami Mituhashi, Kanagawa (JP); Hiroaki Yamazaki, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/892,783

(22) PCT Filed: May 16, 2014

(86) PCT No.: PCT/JP2014/063089
§ 371 (c)(1),
(2) Date: Nov. 20, 2015

(87) PCT Pub. No.: WO2014/188977
PCT Pub. Date: Nov. 27, 2014

(65) Prior Publication Data
US 2016/0167491 A1 Jun. 16, 2016

(30) Foreign Application Priority Data
May 20, 2013 (JP) .................. 2013-105970

(51) Int. Cl.
*B60J 5/04* (2006.01)
(52) U.S. Cl.
CPC ........... *B60J 5/0402* (2013.01); *B60J 5/0426* (2013.01); *B60J 5/0463* (2013.01)
(58) Field of Classification Search
CPC ....... B60J 5/0402; B60J 5/0463; B60J 5/0426
(Continued)

(56) References Cited

U.S. PATENT DOCUMENTS 5,107,624 A * 4/1992 Passone ................. B60J 5/0402
296/146.9
5,735,081 A * 4/1998 Yamanaka ............. B60J 5/0402
29/897.2
(Continued)

FOREIGN PATENT DOCUMENTS

CA 2768476 A1 * 1/2011 ............ B60J 5/0402
EP 2730442 A2 * 5/2014 ............ B60J 5/0402
(Continued)

OTHER PUBLICATIONS

International Search Report for PCT/JP2014/063089 dated Jun. 17, 2014.
(Continued)

*Primary Examiner* — Jerry Redman
(74) *Attorney, Agent, or Firm* — Millen, White, Zelano & Branigan, P.C.; William Nixon

(57) ABSTRACT

A vertically extending upright pillar sash of a vehicle door frame is formed by combining a first member which includes a glass run channel, for holding a glass run, on an inner peripheral side of the door frame, and a second member which includes a portion projecting toward a vehicle interior with respect to the glass run channel. The first member and the second member each includes facing portions that are spaced from each other and face each other in a direction connecting the inner peripheral side and an outer peripheral side of the door frame, and fixing portions that are provided at the upper part of the upright pillar sash by overlaying the facing portions on each other and fixing the facing portions to each other in the direction connecting the inner peripheral side and the outer peripheral side of the door frame.

10 Claims, 13 Drawing Sheets

(58) Field of Classification Search
USPC .......................................................... 49/502
See application file for complete search history.

(56) References Cited

U.S. PATENT DOCUMENTS

| | | | | |
|---|---|---|---|---|
| 8,651,557 B2* | 2/2014 | Suzuki | .................. | B60J 5/0401 296/146.2 |
| 8,955,901 B2* | 2/2015 | Yamada | ................ | B21D 19/08 296/146.9 |
| 9,027,285 B2* | 5/2015 | Fukui | .................... | B60J 5/0402 49/440 |
| 9,186,964 B2* | 11/2015 | Im | .......................... | B60J 5/0402 |
| 2004/0123526 A1* | 7/2004 | Hock | ..................... | B60J 5/0402 49/502 |
| 2004/0244298 A1* | 12/2004 | Ogawa | .................. | B60J 5/0405 49/502 |
| 2006/0181107 A1* | 8/2006 | Nishikawa | ............. | B60J 5/0402 296/146.2 |
| 2009/0115220 A1* | 5/2009 | Takeuchi | ............... | B60J 5/0402 296/146.6 |
| 2012/0247026 A1* | 10/2012 | Sato | ........................ | B60R 13/04 49/493.1 |
| 2014/0059942 A1* | 3/2014 | Goto | ......................... | E06B 9/42 49/502 |
| 2014/0217772 A1* | 8/2014 | Yamada | ................. | B60J 5/0401 296/146.5 |

FOREIGN PATENT DOCUMENTS

| | | | | |
|---|---|---|---|---|
| JP | 01285419 A | * | 11/1989 | |
| JP | H04151328 A | | 2/1992 | |
| JP | 2006082749 A | | 3/2006 | |
| JP | 2006298323 A | | 11/2006 | |
| JP | WO 2008123409 A1 | * | 10/2008 | ............ B60J 5/0402 |
| JP | 2008302788 A | | 12/2008 | |
| JP | 2010116043 A | | 5/2010 | |
| JP | 2010269741 A | | 12/2010 | |
| JP | WO 2013051589 A1 | * | 4/2013 | ............ B60J 5/0402 |
| JP | WO 2014163133 A1 | * | 10/2014 | ............ B60J 5/0402 |

OTHER PUBLICATIONS

English Abstract Cited for JPH04151328, Publication Date: May 25, 1992.
English Abstract Cited for JP2010269741, Publication Date: Dec. 2, 2010.
English Abstract Cited for JP2010116043, Publication Date: May 27, 2010.
English Abstract Cited for JP2008302788, Publication Date: Dec. 18, 2008.
English Abstract for JP2006298323, Publication Date: Nov. 2, 2006.
English Translation for Related Japanese Patent Application No. 2013-105970, Drafting Date: Dec. 22, 2016, Dispatch Date: Jan. 10, 2017.

* cited by examiner

VEHICLE DOOR FRAME

TECHNICAL FIELD

The present invention relates to a door frame of a vehicle door, and in particular to an upright pillar sash that constitutes a component of the door frame.

BACKGROUND ART

A vehicle door frame in which an upright pillar sash, which extends in the vertical direction of the door, and an upper sash, which forms the upper edge of the door, are joined together at a door corner portion is known in the art (Patent Literature 1). As a joining structure at the door corner portion, a type of joining structure in which an upper part of the upright pillar sash is obliquely cut off to form a joining surface and in which the upper sash is joined to this joining surface is known in the art.

CITATION LIST

Patent Literature

Patent Literature 1: Japanese Unexamined Patent Publication No. 2008-302788

SUMMARY OF THE INVENTION

Technical Problem

In the type of upright pillar sash which is made up of a plurality of members that are combined together, if the fixing strength between members in the door corner portion is insufficient, deformation occurs due to the load caused by a machining process (e.g., a cutting process) for forming a joining surface on the upright pillar sash which is joined to the upper sash, which may cause a poor joint between the upright pillar sash and the upper sash. The risk of occurrence of such a poor joint increases especially in the case where the door corner portion and other portions having a general cross-section are formed to have a mutually different cross-sectional shape.

The present invention has been devised in view of the above described problems, and an object of the present invention is to provide a vehicle door frame which is superior in fixing strength between components of the upright pillar sash in the door corner portion.

Solution to Problem

The present invention relates to a vehicle door frame which includes an upright pillar sash extending in the vertical direction, wherein an upper sash is joined to a joining surface formed at an upper part of the upright pillar sash to form a door corner portion. The upright pillar sash is characterized by being formed by combining a first member which includes a glass run channel, for holding a glass run, on an inner peripheral side of the door frame, and a second member which includes a sac-like sectional portion projecting toward a vehicle interior with respect to the glass run channel; the first member and the second member each includes facing portions which are spaced from each other and face each other in a direction connecting the inner peripheral side and an outer peripheral side of the door frame, and fixing portions which are provided at the upper part of the upright pillar sash by overlaying the facing portions on each other and fixing the facing portions to each other in the direction connecting the inner peripheral side and the outer peripheral side of the door frame.

More specifically, it is acceptable for the first member to include a channel portion which constitutes the glass run channel, and a design portion which is positioned on a vehicle exterior side of the channel portion; the second member to include the sac-like sectional portion, a design portion which is positioned closer to a vehicle exterior than the sac-like sectional portion, and a connecting portion which connects the design portion and the sac-like sectional portion; and for the channel portion of the first member and the connecting portion of the second member to be fixed to each other at the fixing portions.

In addition to being fixed via the fixing portions, it is desirable for the first member and the second member are fixed to each other at mutual ends of the design portions of the first member and the second member and at ends of the channel portion and the sac-like sectional portion.

It is desirable for the first member to be formed by roll forming, and for the second member to be formed by press forming.

The sac-like sectional portion of the second member can include an inner peripheral side wall and an outer peripheral side wall which are spaced from each other toward the inner peripheral side and the outer peripheral side of the door frame, respectively, and face each other; a vehicle interior side wall which connects vehicle interior side ends of the inner peripheral side wall and the outer peripheral side wall; and an extension wall which is extended toward the inner peripheral side of the door frame from the inner peripheral side wall. It is acceptable for the extension wall to project toward the inner peripheral side of the door frame relative to the glass run channel in the door corner portion. Furthermore, it is desirable for the extension wall to be formed up to an upper end of the upright pillar sash.

Advantageous Effects of the Invention

According to the door frame of the present invention, the fixing strength between the first member and the second member, which constitute components of the upright pillar sash, in the door corner portion is increased, which makes it possible to prevent the occurrence of deformation, etc., when a joining surface is formed on the upright pillar sash.

DESCRIPTION OF EMBODIMENTS

Figure 1:
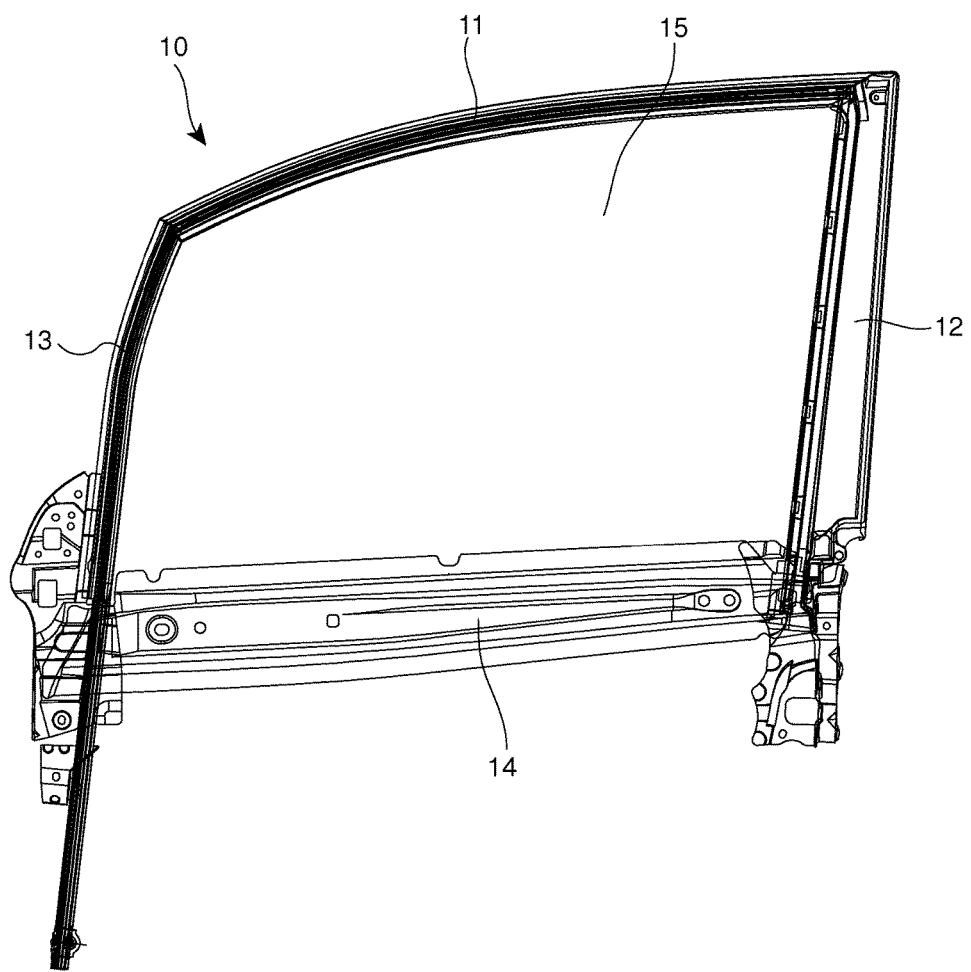
FIG. 1 is side elevational view of a door frame for a motor-vehicle front door, to which the present invention is applied, viewed from the vehicle interior side.

A door frame 10 shown in FIG. 1 that is for a motor-vehicle front door is provided with an upper sash 11 which forms the upper edge of the door, an upright pillar sash 12 which is connected to the rear end of the upper sash 11, a front sash 13 which is connected to the front end of the upper sash 11 and a belt line reinforcement 14 which connects lower parts of the upright pillar sash 12 and the front sash 13. A window opening 15 is formed as an area surrounded by the upper sash 11, the upright pillar sash 12, the front sash 13 and the belt line reinforcement 14, and a door glass (not shown in the drawings) moves up and down in the window opening 15 in a door completed state. In the following descriptions, the side of the door frame 10 that faces the window opening 15 will be referred to as the "inner peripheral side", and the other side of the door frame 10 (the side of the door frame 10 which faces the door opening of the vehicle body) will be referred to as the "outer peripheral side". In addition, terms indicating a direction such as the "front", "rear", "up", "down", "vehicle interior side" and "vehicle exterior side", will be mentioned in the following descriptions to designate directions determined with reference to the vehicle body, to which the door 10 is attached. A glass run (not shown) made of an elastic material is supported on the inner peripheral side of the upper sash 11, the upright pillar sash 12 and the front sash 13 that face the window opening 15; an edge of the door glass is held by the glass run. A weather strip (not shown) made of an elastic material is installed onto the outer peripheral side of the upper sash 11, the upright pillar sash 12 and the front sash 13. This weather strip comes into contact with the vehicle body and is elastically deformed to make the gap between the door and the vehicle body watertight when the door is closed.

Figure 2:
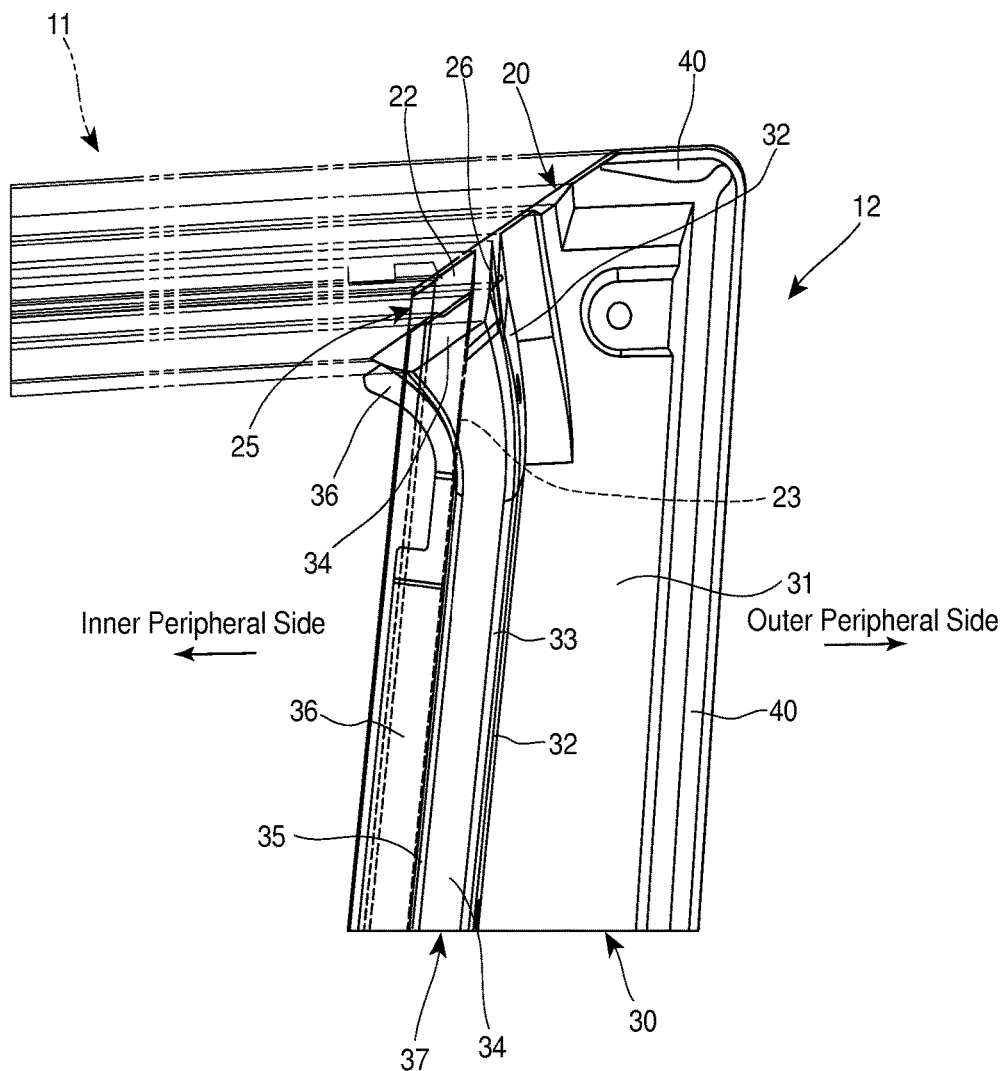
FIG. 2 is an enlarged side elevational view of the door corner portion of the door frame shown in FIG. 1 in which the upper sash and the upright pillar sash are joined together, viewed from the vehicle interior side.
Figure 3:
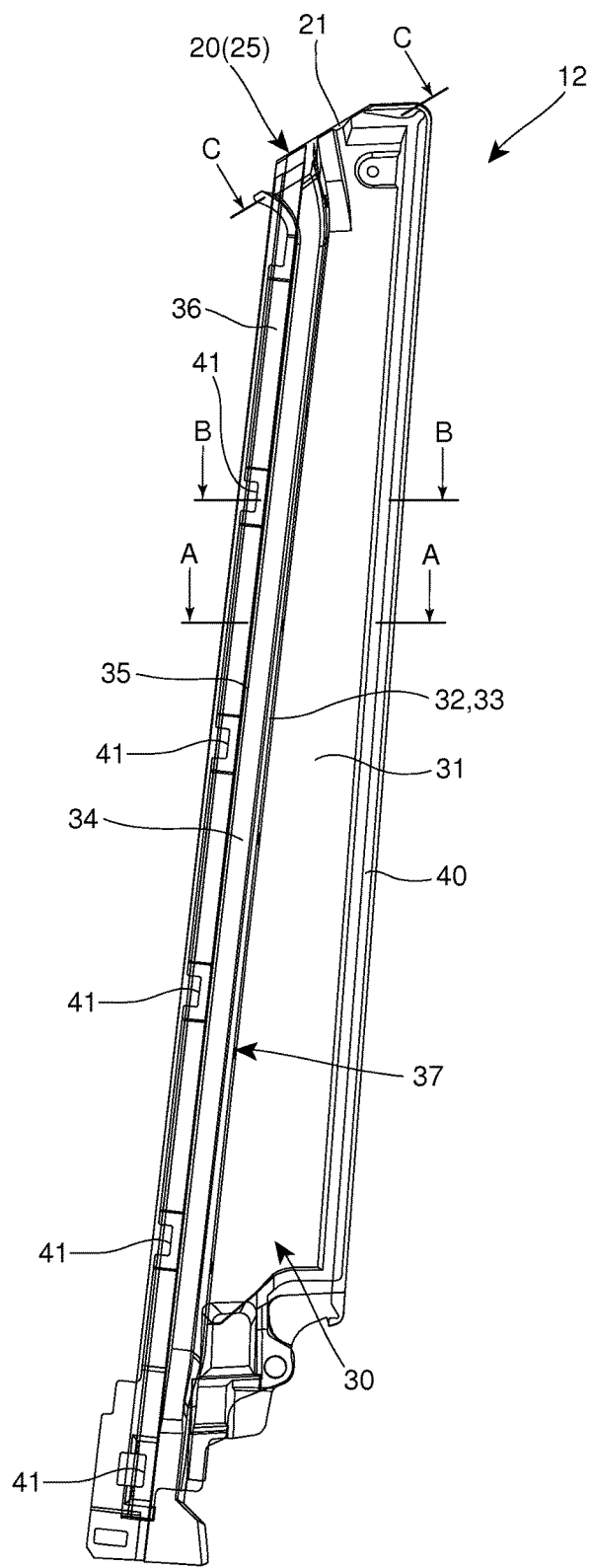
FIG. 3 is a side elevational view of the upright pillar sash for the front door, viewed from the vehicle interior side.

As shown in FIGS. 2 and 3, in the door corner portion in which the upper sash 11 and the upright pillar sash 12 are joined, a joining surface having an obliquely cut shape is formed on an upper part of the upright pillar sash 12, and the rear end of the upper sash 11 is butt-joined to this joining surface. In FIG. 2, to make the upright pillar sash 12 easy to identify visually, the upper sash 11 is shown by two-dot chain lines. FIG. 3 shows the upright pillar sash 12 in a state before the upright pillar sash 12 is joined to the upper sash 11.

Figure 9:
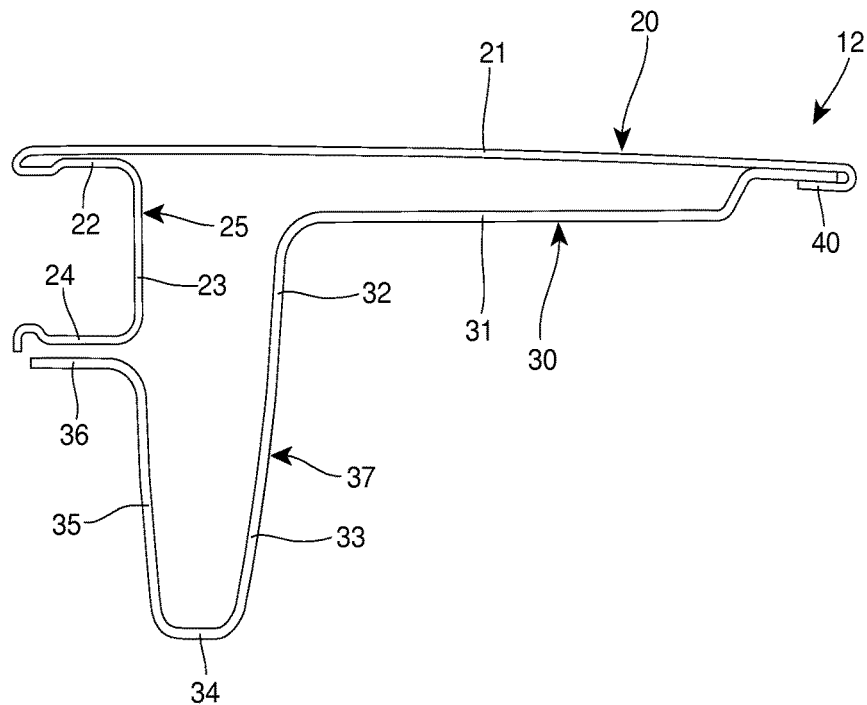
FIG. 9 is a cross sectional view of the upright pillar sash for the front door, taken along the line A-A shown in FIG. 3.
Figure 10:
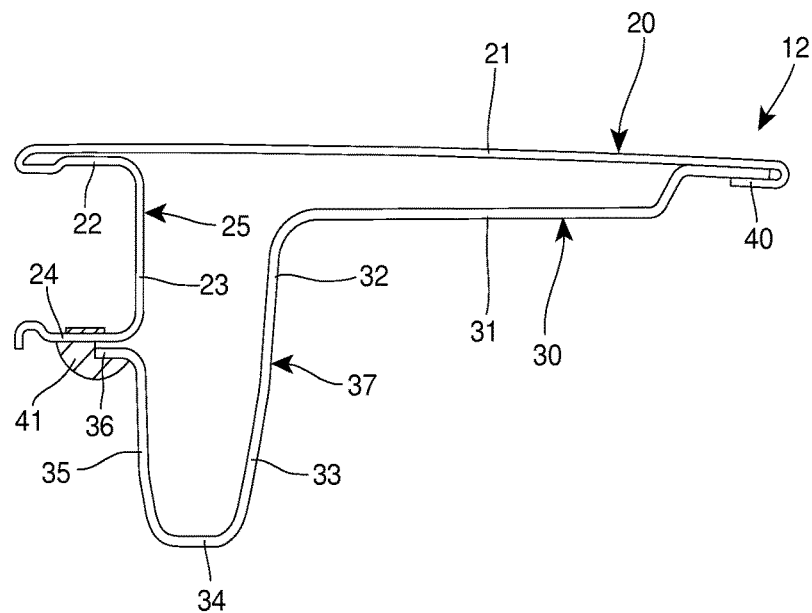
FIG. 10 is a cross sectional view of the upright pillar sash for the front door, taken along the line B-B shown in FIG. 3.
Figure 11:
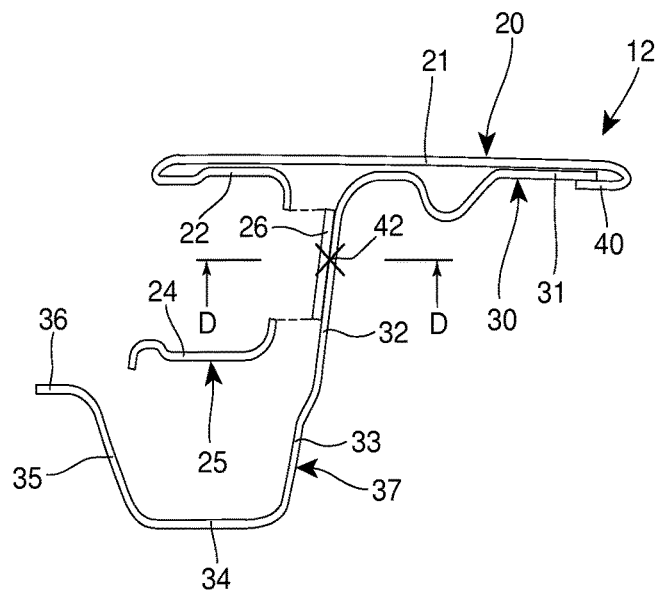
FIG. 11 is a cross sectional view of the upright pillar sash for the front door, taken along the line C-C shown in FIG. 3.

As shown in FIGS. 9 through 11, the upright pillar sash 12 is formed by combining an outer frame 20 and an inner frame 30. The outer frame 20 is an elongated member which is formed of a metal sheet by roll forming. The outer frame 20 is provided with a design wall (design portion) 21, an inner wall 22, a base wall 23 and an inner wall 24. The design wall 21 is positioned on the vehicle exterior side, the inner wall 22 is formed by bending the inner peripheral side end of the design wall 21 toward the vehicle interior to extend alongside the design wall 21, the base wall 23 is bent toward the vehicle interior from the inner wall 22, and the inner wall 24 is bent toward the inner peripheral side from the base wall 23. The base wall 23 is provided to extend in a direction to connect the vehicle interior side with the vehicle exterior side, and the inner wall 22 and the inner wall 24 extend toward the inner peripheral side from respective ends of the base wall 23. The inner wall 22, the base wall 23 and the inner wall 24 form a glass run channel 25. The glass run channel 25 has a box shaped cross section which is open at the inner peripheral side of the door frame 10, and the glass run channel 25 supports a glass run thereinside.

The inner frame 30 is an elongated member which is formed of a metal sheet by press forming. The inner frame 30 is provided with a vehicle exterior side wall (design portion) 31, a connecting wall 32, an outer peripheral side wall 33, a vehicle interior side wall 34, an inner peripheral side wall 35 and an extension wall 36. The vehicle exterior side wall 31 is positioned on the vehicle exterior side, the connecting wall 32 extends toward the vehicle interior from the inner peripheral side end of the vehicle exterior side wall 31, the outer peripheral side wall 33 is continuous with the connecting wall 32 and extends toward the vehicle interior, the vehicle interior side wall 34 extends toward the inner peripheral side from the vehicle interior side end of the outer peripheral side wall 33, the inner peripheral side wall 35 extends toward the vehicle exterior from the inner peripheral side end of the vehicle interior side wall 34, and the extension wall 36 is bent toward the inner peripheral side from an end of the inner peripheral side wall 35. In the inner frame 30, the vehicle interior side wall 34 is positioned closest to the vehicle interior, and the outer peripheral side wall 33 and the inner peripheral side wall 35 are extended toward the vehicle exterior from both ends of the vehicle interior side wall 34, respectively. The outer peripheral side wall 33, the vehicle interior side wall 34, the inner peripheral side wall 35 and the extension wall 36 constitute a sac-like sectional portion 37 which projects toward the vehicle interior with respect to the glass run channel 25; the sac-like sectional portion 37 enhances the sectional strength of the upright pillar sash 12. The connecting wall 32 connects the vehicle exterior side wall 31 and the sac-like sectional portion 37, and the weather strip is supported along the outer peripheral side surface of the connecting wall 32.

The outer frame 20 and the inner frame 30 are combined to have a positional relationship in which the outer peripheral side end of the vehicle exterior side wall 31 is overlaid onto the vehicle interior side surface of the design wall 21, and the extension wall 36 is overlaid onto the vehicle interior side surface of the inner wall 24; thereupon, the outer frame 20 and the inner frame 30 are fixed to each other at the outer and inner peripheral side ends thereof. As shown in FIGS. 9 and 10, the outer peripheral side ends of the outer frame 20 and the inner frame 30 are fixed at a hemmed portion 40. The hemmed portion 40 has a structure in which the outer peripheral side end of the design portion 21 is folded toward the vehicle interior to clasp the vehicle exterior side wall 31 on both sides thereof. As shown in FIGS. 3 and 10, the inner peripheral side ends of the outer frame 20 and the inner frame 30 are fixed to each other by fixing the extension wall 36 and the inner wall 24 to each other via arc welds 41. The projecting amounts of the extension wall 36, toward the inner peripheral side, at locations where the arc weld 41 are welded are shorter than those at other locations of the extension wall 36, and welding is carried out along the edges of the edge portions of the extension wall 36 that are shortened. As shown in FIG. 3, the welding operation to form the arc welds 41 is performed at different positions in the lengthwise direction of the upright pillar sash 12. As shown in FIGS. 9 and 10, the upright pillar sash 12 which is configured of the combination of the outer frame 20 and the inner frame 30 forms a closed cross section, and the base wall 23 of the outer frame 20 and the connecting wall 32 of the inner frame 30 are formed as portions which are spaced from each other and face each other in a direction connecting the inner peripheral side with the outer peripheral side of the upright pillar sash 12.

Figure 4:
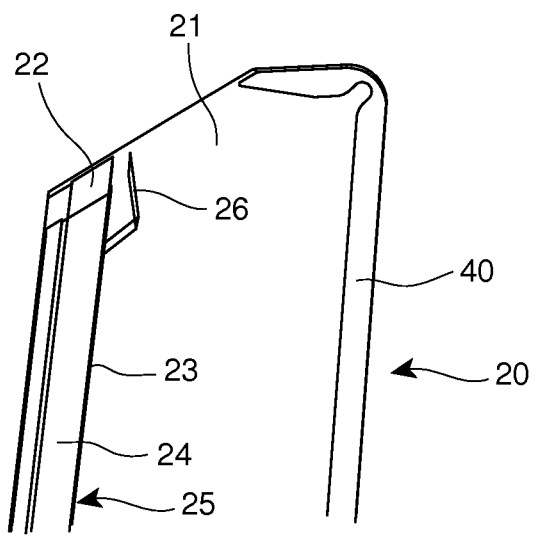
FIG. 4 is a side elevational view of a portion of an outer frame which constitutes a component of the upright pillar sash for the front door, viewed from the vehicle interior side.
Figure 5:
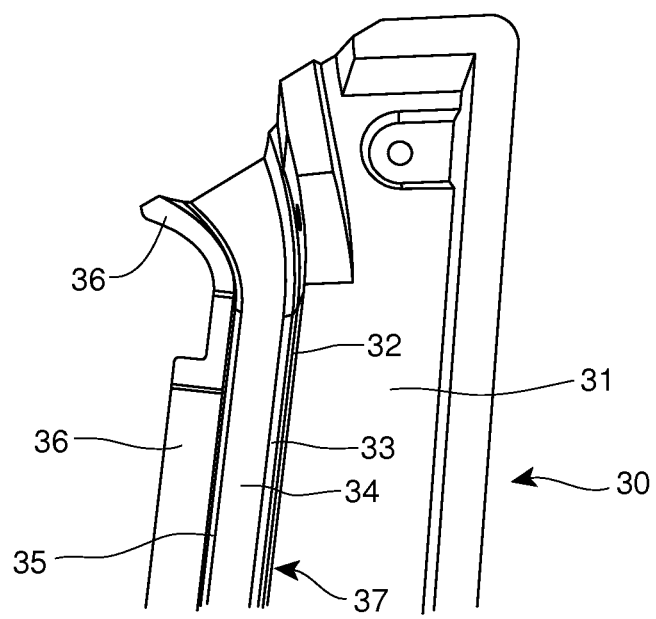
FIG. 5 is a side elevational view of a portion of an inner frame which constitutes a component of the upright pillar sash for the front door, viewed from the vehicle interior side.
Figure 12:
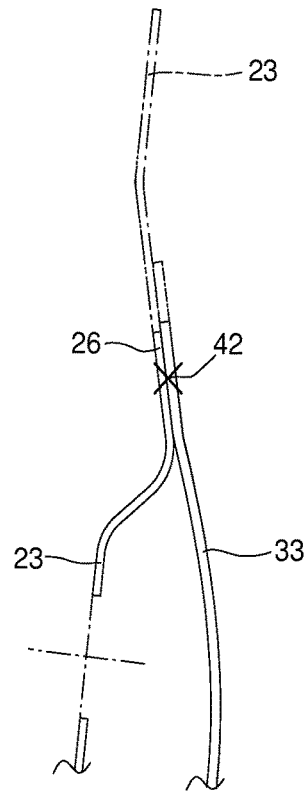
FIG. 12 is a cross sectional view of the upright pillar sash for the front door, taken along the line D-D shown in FIG. 11.

As shown in FIG. 11, the cross sectional shape of the upright pillar sash 12 in the door corner portion that is connected to the upper sash 11 is different from the general cross-sectional shapes shown in FIGS. 9 and 10. As shown in FIG. 5, in the door corner portion, the distance between the outer peripheral side wall 33 and the inner peripheral side wall 35 progressively increases in the sac-like sectional portion 37. The extension wall 36 is formed continuously with the door corner portion to reach the upper end of the upright pillar sash 12. According, in the door corner portion, the extension wall 36 is shifted toward the inner peripheral side with respect to the inner wall 24, so that the extension wall 36 and the inner wall 24 cannot be fixed to each other using the arc welds 41 or the like. A fixing lug 26 is formed at an upper part of the outer frame 20 as a fixing portion that replaces the inner wall 24 and the extension wall 36. As shown in FIGS. 4, 11 and 12, the fixing lug 26 is formed by cutting and raising a portion of the base wall 23 of the glass run channel 25 toward the outer peripheral side. As described above, the connecting wall 32 of the inner frame 30 is positioned to face the outer peripheral side of the base wall 23, and the fixing lug 26 that projects toward the outer peripheral side comes in contact with (is overlaid onto) the connecting wall 32. Additionally, the fixing lug 26 and the connecting wall 32 are fixed to each other via a spot weld 42 (see FIGS. 11 and 12).

Figure 6:
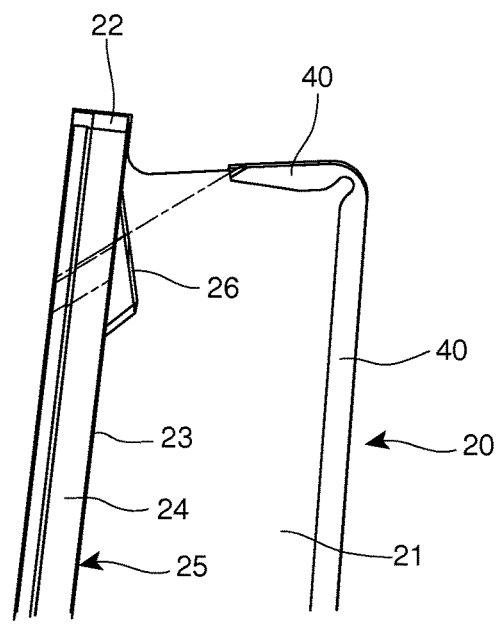
FIG. 6 is a side elevational view of the outer frame, which constitutes a component of the upright pillar sash for the front door, in a state before a joining surface is formed, viewed from the vehicle interior side.
Figure 7:
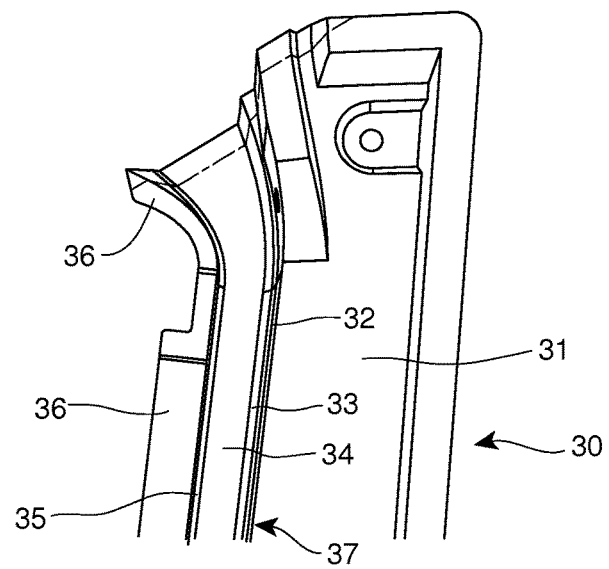
FIG. 7 is a side elevational view of the inner frame, which constitutes a component of the upright pillar sash for the front door, in a state before the joining surface is formed, viewed from the vehicle interior side.
Figure 8:
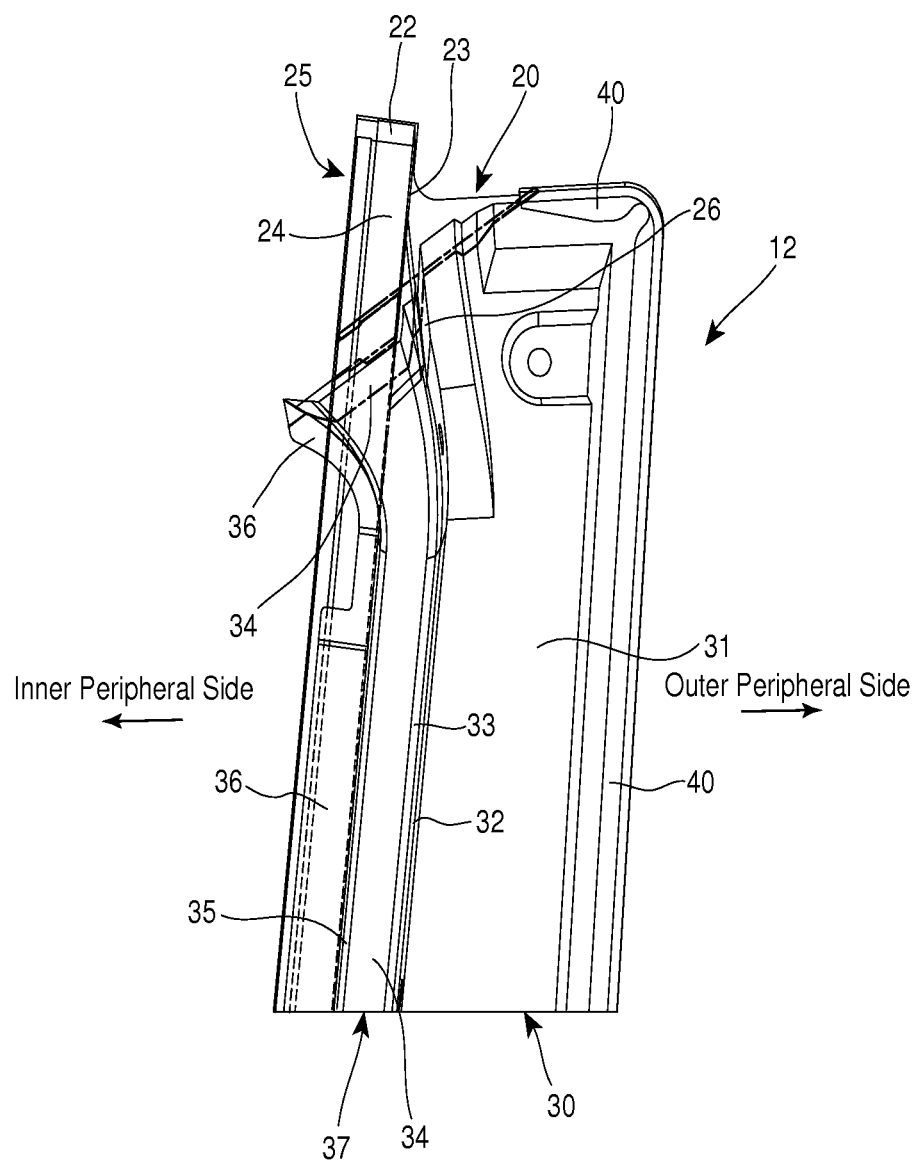
FIG. 8 is a side elevational view of a portion of the upright pillar sash for the front door in a state before the joining surface is formed, viewed from the vehicle interior side.

The joining surface of the upright pillar sash 12 to the upper sash 11 is formed by partially cutting off an upper part of the upright pillar sash 12. FIG. 8 shows the upright pillar sash 12 in a state before the upper part thereof is cut off, and FIGS. 6 and 7 show the shapes of the outer frame 20 and the inner frame 30 alone, respectively, in a state before the said upper part is cut off. The one-dot chain line shown in each of FIGS. 6 through 8 shows a cutting line (joining surface). In addition, the one-dot chain lines shown in FIG. 12 show portions to be cut off. FIGS. 6 and 7 show the outer frame 20 and the inner frame 30 separately to make the portions thereof which are to be cut off easy to identify visually; however, in practice, the upper part of the upright pillar sash 12 is cut off with the outer frame 20 and the inner frame 30 combined as shown in FIG. 8.

As shown in FIG. 6, the fixing lug 26 in the upright pillar sash 12 before the removal is connected at the upper and lower ends thereof to the base wall 23 and is provided with a mound-like sectional shape, a middle part of which projects toward the outer peripheral side. The mound-shaped fixing lug 26 and the connecting wall 32 are fixed via the spot weld 42. Subsequently, removing the upper part of the upright pillar sash 12 causes the shape of the fixing lug 26 to change into that of a cantilever, only the lower end of which being connected to the base wall 23, as shown in FIGS. 4 and 12. The cantilever-shaped fixing lug 26 maintains the fixing relationship with the connecting wall 32. In other words, the fixing portion formed by the fixing lug 26 and the connecting wall 32 is provided at the part of the top of the upright pillar sash 12 that is not cut off.

As described above, in addition to the fixation by the hemmed portion 40, the base wall 23 and the connecting wall 32, which are spaced from each other at general cross sections, are fixed to the connecting wall 32 using the fixing lug 26, which increases the fixing strength between the outer frame 20 and the inner frame 30 in the door corner portion, thus making it possible to prevent the outer frame 20 and the inner frame 30 from being unnecessarily deformed when an upper part of the upright pillar sash 12 is cut off. Specifically, the structure in which the fixing lug 26 and the connecting wall 32 that are overlaid onto each other, in a direction connecting the inner peripheral side with the outer peripheral side of the door frame 10, makes it possible to obtain a high deforming-prevention effect when an upper part of the upright pillar sash 12 is cut off by moving a cutting blade from the outer peripheral side of the door frame 10 toward the inner peripheral side of the door frame 10 (or vice versa).

As shown in FIG. 11, the extension wall 36 is also formed on the inner frame 30 in the door corner portion. Since the extension wall 36 is at a positioned that is shifted relative to the inner frame 24 in the door corner portion as mentioned above, the extension wall 36 is not used thereat as a fixing portion for fixing the outer frame 20 to the inner frame 30. However, leaving the extension wall 36 that extends from the outer peripheral side toward the inner peripheral side makes it possible to increase the strength of the periphery of the sac-like sectional portion 37, thereby obtaining a deforming prevention effect when an upper part of the upright pillar sash 12 is cut off by moving a cutting blade from the outer peripheral side of the door frame 10 toward the inner peripheral side of the door frame 10.

In the above described embodiment, the cut-and-raised shaped fixing lug 26 is formed on the outer frame 20 side.

Figure 13:
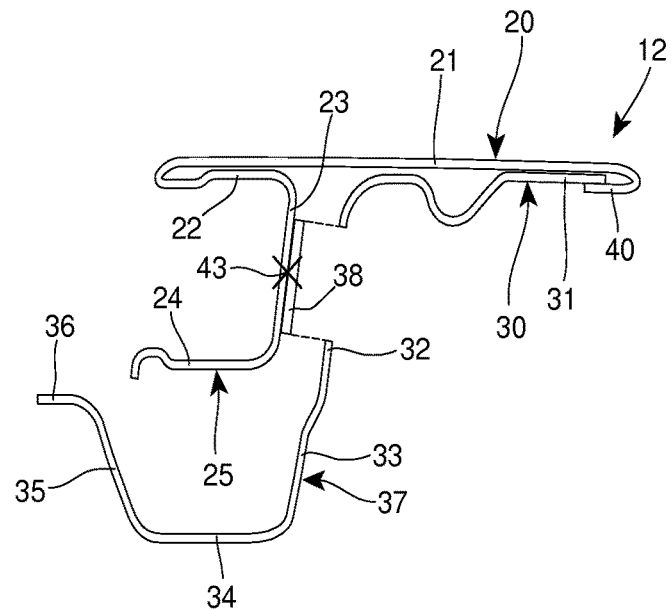
FIG. 13 is a cross sectional view of the upright pillar sash for the front door in another embodiment in which the fixing structure of the outer frame and the inner frame in the door corner portion is different from that in the previous embodiment.
Figure 14:
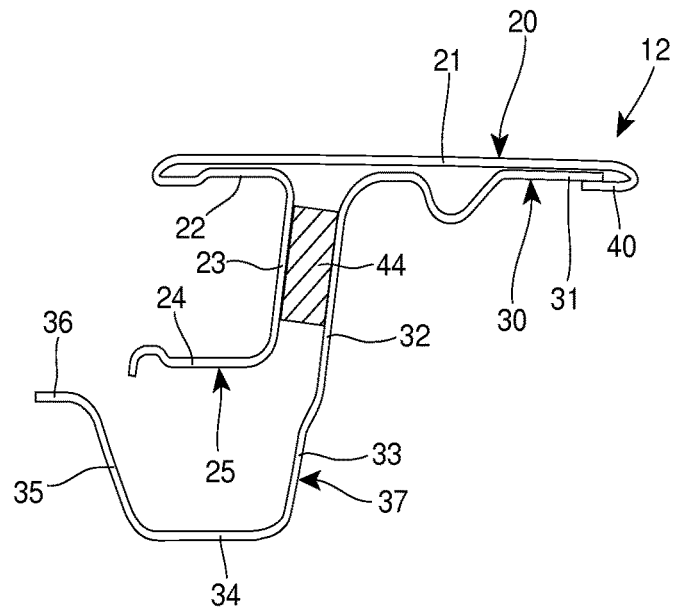
FIG. 14 is a cross sectional view of the upright pillar sash for the front door in another embodiment in which the fixing structure of the outer frame and the inner frame in the door corner portion is different from that in the previous embodiments.
Figure 15:
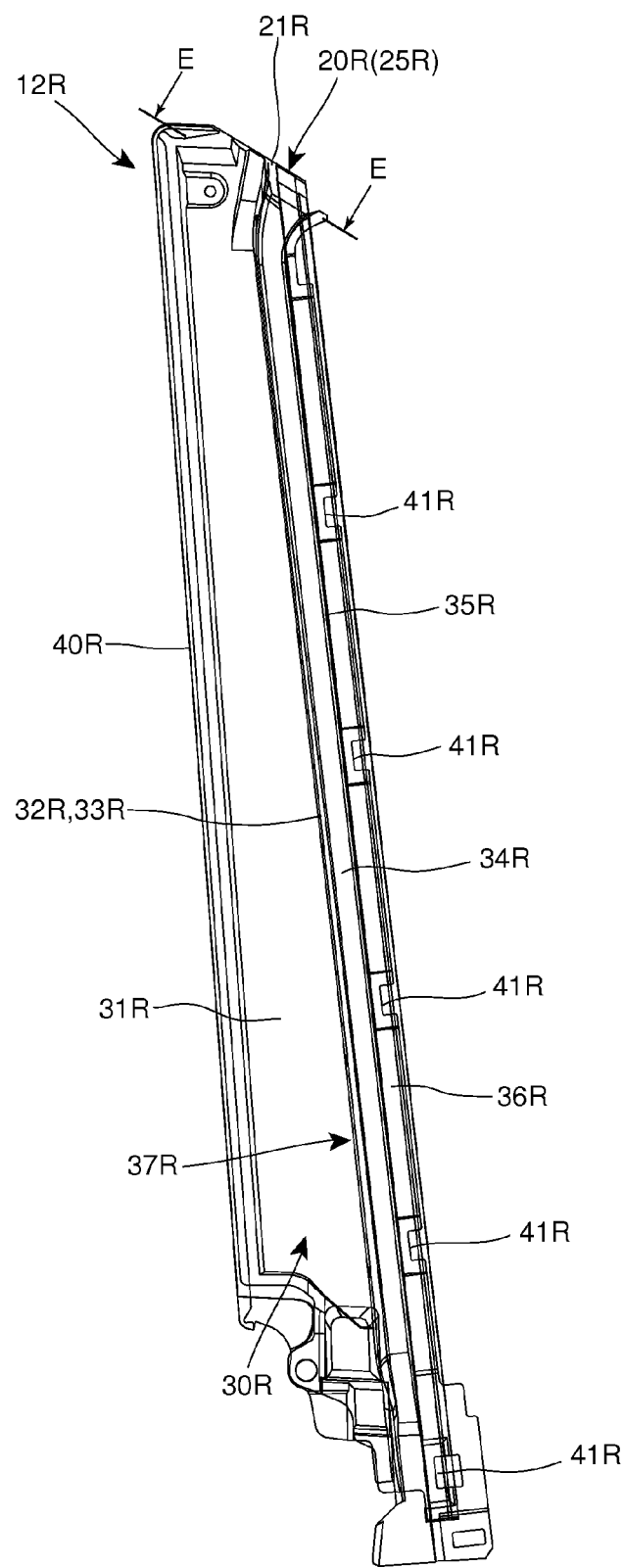
FIG. 15 is a side elevational view of the upright pillar sash which constitutes a component of a door frame for a rear door, viewed from the vehicle interior side.
Figure 16:
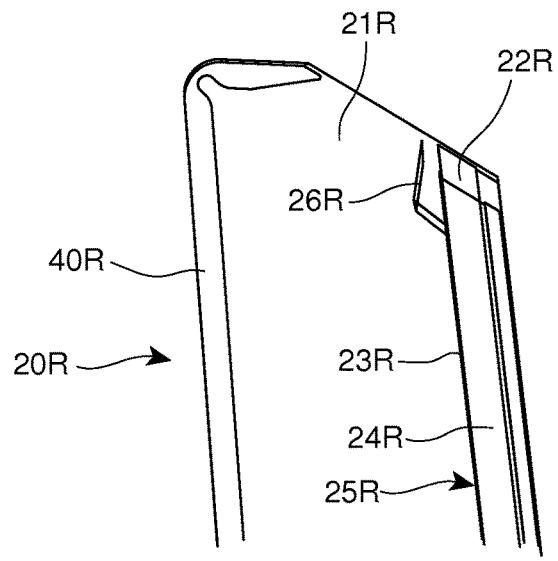
FIG. 16 is a side elevational view of a portion of an outer frame which constitutes a component of the upright pillar sash for the rear door, viewed from the vehicle interior side.
Figure 17:
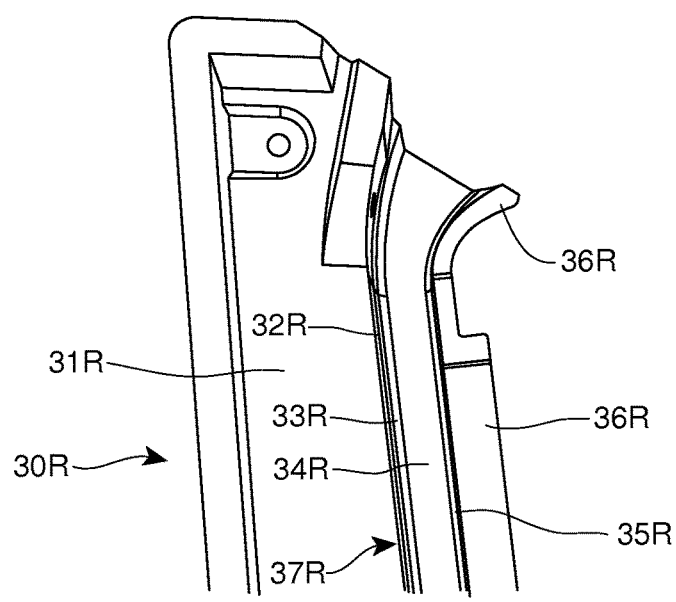
FIG. 17 is a side elevational view of a portion of an inner frame which constitutes a component of the upright pillar sash for the rear door, viewed from the vehicle interior side.
Figure 18:
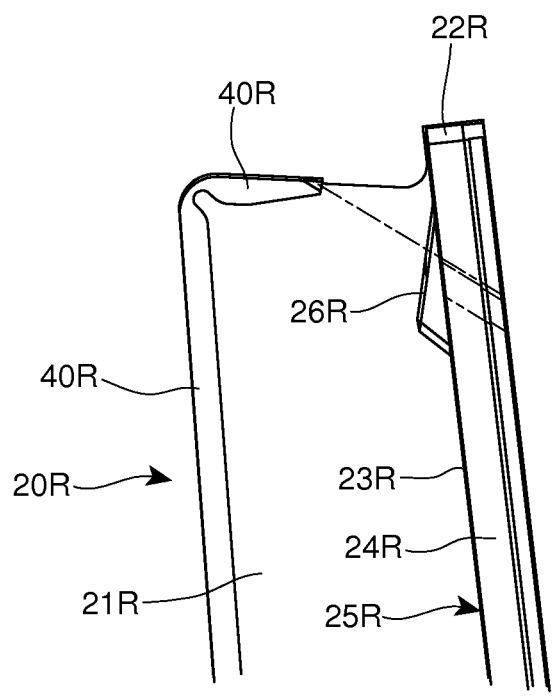
FIG. 18 is a side elevational view of the outer frame of the upright pillar sash for the rear door in a state before a joining surface is formed, viewed from the vehicle interior side.
Figure 19:
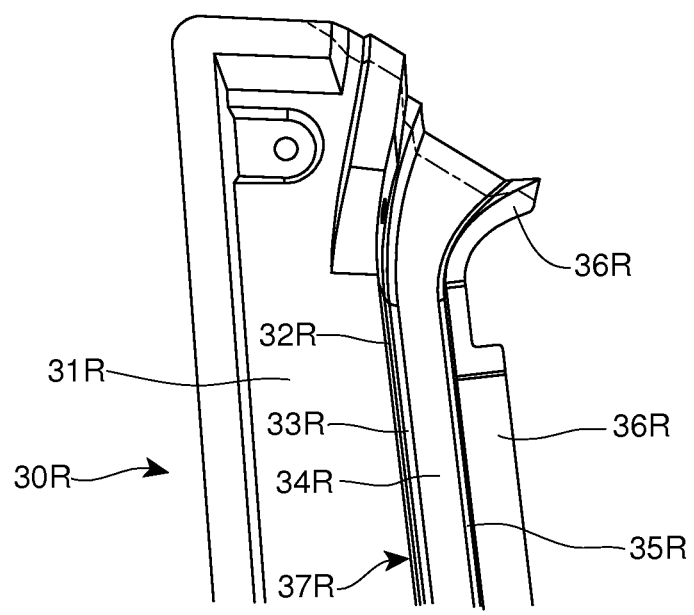
FIG. 19 is a side elevational view of the inner frame of the upright pillar sash for the front door in a state before the joining surface is formed, viewed from the vehicle interior side.
Figure 20:
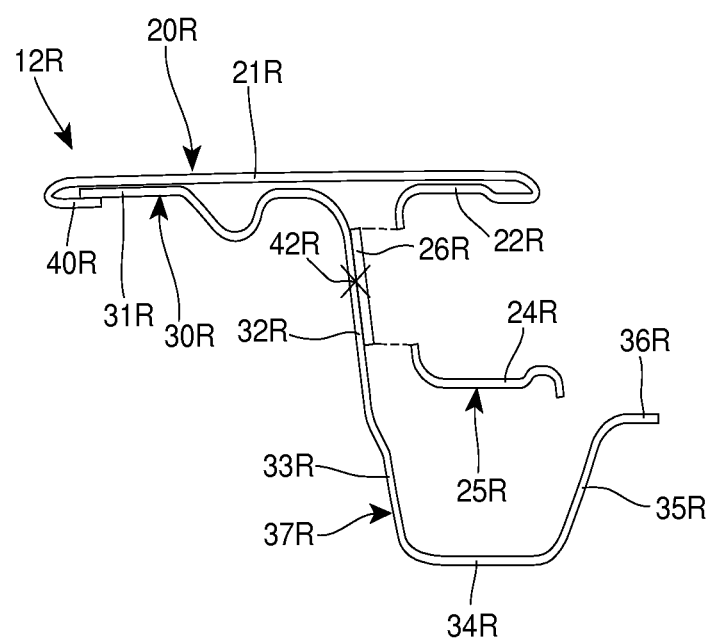
FIG. 20 is a cross sectional view of the upright pillar sash for the rear door, taken along the line E-E shown in FIG. 15.

Since this structure is not accompanied by a change in the shape of the connecting wall 32 of the inner frame 30, it is possible to make the connecting wall 32 maintain the shape thereof for supporting the weather strip up to the upper end of the upright pillar sash 12; however, it is also possible to achieve the fixing between the outer frame 20 and the inner frame 30 in the door corner portion in a different manner from this. For instance, in another embodiment shown in FIG. 13 that shows the same cross-sectional position as that of FIG. 11, a fixing lug 38 which projects toward the inner peripheral side is formed by cutting and raising, etc., the connecting wall 32 of the inner frame 30, and the fixing lug 38 is overlaid onto the base wall 23 and fixed thereto via a spot weld 43. In another embodiment shown in FIG. 14 that shows the same cross-sectional position as that of FIG. 11, an intermediate fixing member 44, which is a separate member from the outer frame 20 and the inner frame 30, is inserted in between the base wall 23 of the outer frame 20 and the connecting wall 32 of the inner frame 30, and the base wall 23 and the connecting wall 32 are overlaid onto each other and fixed to the intermediate fixing member 44.

In each of the above described embodiments, the base wall 23 of the outer frame 20 and the connecting wall 32 of the inner frame 30 are fixed relative to each other in the door corner portion. This fixed portion has a merit of not spoiling the appearance of the door frame because the glass run channel 25 is positioned on the inner peripheral side of the fixed portion and the weather strip covers the outer peripheral side of the fixed portion, so that welding marks, etc., do not become outwardly visible.

Although the above discussion has been directed to the case where the present invention has been applied to the door frame 10 for a front door, the present invention can also be applied to the door frame of a door other than front doors, as long as the door has an upright pillar sash. FIGS. 15 through 20 show an embodiment in which the present invention has been applied to an upright pillar sash 12R which constitutes a component of a door frame for a motor-vehicle rear door. The upright pillar sash 12R is different from the upright pillar sash 12 in that the upright pillar sash 12R is reverse in front/rear position to the upright pillar sash 12; however, the basic structure of the upright pillar sash 12R (other than such a reversal structure) is identical to the upright pillar sash 12, so that descriptions of the upright pillar sash 12R that are redundant will be omitted from the following descriptions. In FIGS. 15 through 19, this embodiment is distinguished from the previous embodiment by adding the letter R as a suffix to the reference numerals, and the elements of this embodiment whose reference numerals from which the suffix R is removed are identical to those of the previous embodiment have the same structure and capability as those of the previous embodiment. Although FIGS. 15 through 20 show an embodiment in which a fixing lug 26R is formed on an outer frame 20R, an embodiment in which a fixing lug (similar to the fixing lug 38 shown in FIG. 13) is formed on the inner frame 30R and an embodiment in which a separate member (similar to the intermediate fixing member 44 shown in FIG. 14) is inserted in between the outer frame 20R (a base wall 23R) and the inner frame 30R (a connecting wall 32R) can also be selected.

Although the present invention has been described based on the above illustrated embodiments, the present invention is not limited solely to these particular embodiments; various modifications to the above illustrated embodiments are possible without departing the gist of the present invention. For instance, only the outer frame 20 or 20R and the inner frame 30 or 30R are shown as the components of the upper sash 12 or 12R in the above illustrated embodiments; however, the components of the upright pillar sash are not limited solely to these two members. Specifically, it is also possible for a channel member for holding a weather strip to be provided at the outer peripheral side of the connecting wall 32 or 32R of the inner frame 30 or 30R and for a garnish to be installed to cover the vehicle exterior side of the design wall 21 or 21R of the outer frame 20 or 20R to serve as a decorative member of the upright pillar sash 12 of 12R.

INDUSTRIAL APPLICABILITY

As described above in detail, in the vehicle door frame according to the present invention, the upright pillar sash is formed by combining a first member which includes a glass run channel, for holding a glass run, on an inner peripheral side of the door frame, and a second member which includes a sac-like sectional portion projecting toward a vehicle interior with respect to the glass run channel; and the first member and the second member each includes facing portions which are spaced from each other and face each other in a direction connecting the inner peripheral side and an outer peripheral side of the door frame, and fixing portions which are provided at the upper part of the upright pillar sash by overlaying the facing portions on each other and fixing the facing portions to each other in the direction connecting the inner peripheral side and the outer peripheral side of the door frame. According to this configuration, the fixing strength of the door corner portion at which the upright pillar sash and the upper sash are joined can be increased, thus contributing to an improvement in strength of the door frame.

REFERENCE SIGN LIST

10 Door frame
11 Upper sash
12 12R Upright pillar sash
13 Front sash
14 Belt line reinforcement
15 Window opening
20 20R Outer frame (First member)
21 21R Design wall (Design member)
22 22R Inner wall (Facing wall)
23 23R Base wall (Facing portion of the first member/Fixingportion)
24 24R Inner wall (Facing wall)
25 25R Glass run channel
26 26R Fixing lug (Fixing portion)
30 30R Inner frame (Second member)
31 31R Vehicle exterior side wall (Design portion)
32 32R Connecting wall (Facing portion of the second member/Fixingportion)
33 33R Outer peripheral side wall (Fixing portion)
34 34R Vehicle interior side wall
35 35R Inner peripheral side wall
36 36R Extension wall
37 37R Sac-like sectional portion
38 Fixing lug (Fixing portion)
40 40R Hemmed portion
41 41R Arc weld
42 42R Spot weld
43 Spot weld
44 Intermediate Fixing member (Fixing portion)

The invention claimed is:

1. A vehicle door frame comprising an upright pillar sash extending in a vertical direction and an upper sash joined to a joining surface formed on an upper part of said upright pillar sash to form a door corner portion,
    wherein said upright pillar sash is formed by combining a first member which includes a glass run channel, for holding a glass run, on an inner peripheral side of said door frame, and a second member which includes a portion projecting toward a vehicle interior with respect to said glass run channel,
    wherein said first member and said second member each includes facing portions which are spaced from each other and face each other in a direction connecting said inner peripheral side and an outer peripheral side of said door frame, and fixing portions which are provided at said upper part of said upright pillar sash by overlaying said facing portions on each other and fixing said facing portions to each other in said direction connecting said inner peripheral side and said outer peripheral side of said door frame, and
    wherein said fixing portions include a portion of said first member that is cut and raised, further wherein said portion being cut and raised is fixed on said second member.

2. The vehicle door frame according to claim 1, wherein said first member includes a channel portion which constitutes said glass run channel, and a design portion which is positioned on a vehicle exterior side of said channel portion,
    wherein said second member includes said portion projecting toward a vehicle interior, a design portion which is positioned closer to a vehicle exterior than said portion projecting toward a vehicle interior; and a connecting portion which connects said design portion and said portion projecting toward a vehicle interior, and
    wherein said channel portion of said first member and said connecting portion of said second member are fixed to each other at said fixing portions.

3. The vehicle door frame according to claim 2, wherein, in addition to being fixed via said fixing portions, said first member and said second member are fixed to each other at mutual ends of said design portions of said first member and said second member and at ends of said channel portion and said portion projecting toward a vehicle interior.

4. The vehicle door frame according claim 1, wherein said first member is formed by roll forming, and
    wherein said second member is formed by press forming.

5. The vehicle door frame according to claim 1, wherein said portion projecting toward the vehicle interior comprises:
    an inner peripheral side wall and an outer peripheral side wall which are spaced from each other toward said inner peripheral side and said outer peripheral side of said door frame, respectively, and face each other;
    a vehicle interior side wall which connects vehicle interior side ends of said inner peripheral side wall and said outer peripheral side wall; and
    an extension wall which is extended toward said inner peripheral side of said door frame from said inner peripheral side wall.

6. The vehicle door frame according to claim 5, wherein said extension wall projects toward said inner peripheral side of said door frame relative to said glass run channel in said door corner portion.

7. The vehicle door frame according to claim 5, wherein said extension wall is formed up to an upper end of said upright pillar sash.

8. The vehicle door frame according to claim 5, wherein, in said portion projecting toward the vehicle interior where said fixing portions are formed, a width between said outer peripheral side wall and said inner peripheral side wall in a direction connecting said inner peripheral side and an outer peripheral side of said door frame is larger than a width between said outer peripheral side wall and said inner peripheral side wall in said portion projecting toward the vehicle interior where the fixing portions are not formed.

9. The vehicle door frame according to claim 1, wherein said fixing portions include a fixing lug from said first member and a connecting wall of said second member.

10. The vehicle door frame according to claim 9, wherein said fixing lug is cut and raised from said first member.

* * * * *